US008365284B2

(12) United States Patent
Wahl

(10) Patent No.: US 8,365,284 B2
(45) Date of Patent: Jan. 29, 2013

(54) METHOD FOR PROTECTING A PACKET-BASED NETWORK FROM ATTACKS, AND SECURITY BORDER NODE

(75) Inventor: Stefan Wahl, Schwieberdingen (DE)

(73) Assignee: Alcatel Lucent, Paris (FR)

( * ) Notice: Subject to any disclaimer, the term of this patent is extended or adjusted under 35 U.S.C. 154(b) by 486 days.

(21) Appl. No.: 12/457,069

(22) Filed: Jun. 1, 2009

(65) Prior Publication Data
US 2009/0313698 A1 Dec. 17, 2009

(30) Foreign Application Priority Data

Jun. 12, 2008 (EP) ..................................... 08290549

(51) Int. Cl.
*H04L 29/06* (2006.01)
(52) U.S. Cl. ................ 726/23; 726/24; 726/25; 726/26; 726/2; 726/3; 726/4; 713/151; 713/153; 713/154; 713/169; 713/161; 713/188; 713/189; 709/225; 709/227; 709/246
(58) Field of Classification Search .................. 726/1–36
See application file for complete search history.

(56) References Cited

U.S. PATENT DOCUMENTS

| | | | | |
|---|---|---|---|---|
| 6,728,204 | B1 * | 4/2004 | Helander et al. ............... | 370/216 |
| 7,441,429 | B1 * | 10/2008 | Nucci et al. ...................... | 70/229 |
| 7,526,803 | B2 * | 4/2009 | D'Souza et al. ................ | 726/22 |
| 7,716,729 | B2 * | 5/2010 | Bhatia .............................. | 726/13 |
| 8,060,597 | B2 * | 11/2011 | Wang et al. ..................... | 709/223 |
| 8,085,758 | B2 * | 12/2011 | Ramachandran et al. ..... | 370/352 |
| 8,200,797 | B2 * | 6/2012 | Meng et al. ..................... | 709/223 |
| 2003/0120813 | A1 * | 6/2003 | Majumdar et al. ............. | 709/247 |
| 2005/0097367 | A1 * | 5/2005 | Nakazawa et al. ............. | 713/201 |
| 2006/0143494 | A1 * | 6/2006 | Bouat .................................. | 714/4 |
| 2007/0121596 | A1 * | 5/2007 | Kurapati et al. ................ | 370/356 |
| 2007/0168537 | A1 * | 7/2007 | Misra et al. ..................... | 709/230 |
| 2007/0177607 | A1 * | 8/2007 | Niccolini et al. ............ | 370/395.5 |
| 2007/0209067 | A1 * | 9/2007 | Fogel ............................... | 726/11 |
| 2008/0263661 | A1 * | 10/2008 | Bouzida .......................... | 726/22 |
| 2009/0007220 | A1 * | 1/2009 | Ormazabal et al. ............... | 726/1 |
| 2009/0265456 | A1 * | 10/2009 | Bouvier et al. ................ | 709/224 |
| 2009/0293123 | A1 * | 11/2009 | Jackson et al. ................... | 726/23 |
| 2010/0257580 | A1 * | 10/2010 | Zhao ................................. | 726/1 |
| 2012/0137357 | A1 * | 5/2012 | Ormazabal et al. ............. | 726/12 |

FOREIGN PATENT DOCUMENTS

EP 2081356 A1 * 7/2009

OTHER PUBLICATIONS

Rosenberg, J. et al., "The Session Initiation Protocol (SIP) and Spam", Internet Draft, Feb. 13, 2005, pp. 1-26, XP003010228.

* cited by examiner

Primary Examiner — Syed A. Zia
(74) Attorney, Agent, or Firm — Harness, Dickey & Pierce

(57) ABSTRACT

The invention relates to a security border node (2a) for protecting a packet-based network from attacks, comprising: an anomaly detection unit (10) for performing an anomaly detection, in particular a statistical analysis, on session control messages (11), in particular on SIP messages contained in a packet stream (5) received in the security border node (2a). The security border node further comprises a message context provisioning unit (13) for providing at least one session control message (11) to the anomaly detection unit (10) together with message context information (12, 17, 24) related to a client (22) and/or to a session (23) to which the session control message (11, 11a to 11f) is attributed. The invention also relates to a method for protecting a packet-based network from attacks, to a computer program product, and to a packet-based network.

17 Claims, 2 Drawing Sheets

METHOD FOR PROTECTING A PACKET-BASED NETWORK FROM ATTACKS, AND SECURITY BORDER NODE

BACKGROUND OF THE INVENTION

The invention is based on a priority application EP08290549.8 which is hereby incorporated by reference.

The invention relates to a method for protecting a packet-based network from attacks, the method comprising: performing an anomaly detection, in particular a statistical analysis, on session control messages, in particular on session initiation protocol, SIP, messages contained in a packet stream received in a security border node of the network, and to a computer program product adapted to perform the method. The invention further relates to a security border node for protecting a packet-based network from attacks, comprising: an anomaly detection unit for performing an anomaly detection, in particular a statistical analysis, on session control messages, in particular on SIP messages contained in a packet stream received in the security border node, and to a packet-based network comprising at least one such security border node.

The invention relates to the protection of packet-based networks such as communication/computer networks, in particular core networks, against any kinds of attacks. A core network may be implemented using the ETSI/TISPAN (Telecoms & Internet converged Services & Protocols for Advanced Networks), resp. next generation network (NGN) architecture with an 3GPP/IMS (IP multimedia subsystem) using session/application layer control (signalling) protocols such as the Session Initiation Protocol (SIP) for creating, modifying, and terminating sessions with one or more participants. In such a core network, attacks can occur on different layers (IP, transport, up to the application layer) and the attack strategy can vary. In particular, the application/session protocol stacks in the border nodes of a core network are highly jeopardized and therefore need a protection mechanism to achieve the requested high availability of the whole system, especially for well behaving users/devices. It is understood that the invention is not limited to NGN/IMS/TISPAN networks with SIP signalling, but pertains to all types of IP networks using other types of signalling protocols, e.g. SOAP (Simple Object Access Protocol), H.323, etc.

A core network 1 of the type described above is shown in FIG. 1. The core network 1 has multiple (security) border nodes 2a to 2f for connecting the core network 1 to access networks 3 which are themselves connected to end user equipment 4. Some of the border nodes 2a to 2f may also be used to connect the core network 1 to other core networks (not shown). Within the border nodes 2a to 2f, a security policy needs to be applied that immediately identifies valid from potentially dangerous traffic and identified fraud traffic needs to be blocked. For this purpose, firewalls operating on layer 3/layer 4 (of the OSI model) and signature analysis functions are applied to protect the network. These solutions require that the attack strategy is known in advance. However, upcoming attacks applying new strategies can pass these protection methods. Therefore, "zero day" (i.e. first appearance) attacks cannot be identified and may lead to serious disturbances.

Therefore, on the SIP application/session control layer, there are also different types of protection technologies dealing with different types of attacks: SIP message syntax attacks can be revealed and dealt with techniques such as ABNF (Augmented Backus-Naur Form) checkers. SIP message attacks, on the contrary, show a correct syntax and there is no signature known to identify them as malicious. For identifying these kinds of attacks, anomaly detection strategies are investigating binary and variable length (n-gram) sequences of a byte stream to detect new kinds of attack scenarios. (cf. e.g. "Language Models for Detection of Unknown Attacks in Network Traffic", by K. Rieck, P. Laskov; Fraunhofer FIRST; http://www.springerlink.com). These mechanisms can detect "zero-day" attacks in a byte stream. However, these mechanisms do not have a (sequence) memory to detect attacks which get only visible by associating the n-th with the (n+m)-th sequence. Therefore, all those SIP message attacks which are constructed of a specific correlation (e.g. sequence number, time dependence, source/destination dependence and any combination of these) cannot be identified by and of today's techniques.

OBJECT OF THE INVENTION

It is the object of the invention to provide: a method, a computer program product, a security border node, and a packet-based network, all of which allowing to identify attacks which cannot be revealed by performing anomaly detection in the way described above.

SUMMARY OF THE INVENTION

This object is achieved by a method as described above, further comprising: performing the anomaly detection on at least one session control message and on message context information about the session control message being related to a client and/or to a session to which the session control message is attributed. Each SIP (request) message is associated with a client (user agent), the SIP message e.g. being used for registering the user agent (REGISTER). Each SIP message is typically also related to a session (e.g. for initiating a session (INVITE), terminating a session (BYE) etc.). Context information related to that client and session, respectively, is provided to the anomaly detection together with the SIP message for inspecting the content of the SIP message together with the context information. For this purpose, an anomaly detection unit can be trained to detect attacks in the combination of SIP message and context information by providing a plurality of sample messages together with the context information to the anomaly detection unit and adapting the anomaly detection algorithm by performing a feedback in order to produce the desired output of the anomaly detection.

In such a way, the message context (client and/or session information) can be taken into account, and the invention extends the capabilities of (state of the art) anomaly detection systems (ADS) for SIP based applications so that more sophisticated attacks can be detected which can only be revealed if message history and/or client behavior are correlated (e.g. INVITE flooding). The new capabilities are the following: Detection of session and message protocol anomalies (i.e. the attack only becomes visible when inspecting several SIP messages), Spam Over Internet Telephony (SPIT) detection, and the detection of message rate anomalies which are generated from different sources.

In a preferred variant, the method further comprises the step of including the message context information into the session control message. By including, i.e. adding or appending the message context information into the message text of the SIP messages provided for the anomaly detection, it is guaranteed that the context information and the SIP message are always inspected concurrently by an anomaly detection unit. In such a way, no additional interface is required for providing the context information concurrently with the SIP messages, and no redesign of the components required for performing the anomaly detection is needed. It will be understood that after the anomaly detection and before the processing of the SIP message in the SIP stack the context information should be removed.

In a preferred variant, the method further comprises: addressing a database for storing and retrieving the message context information using information contained in the session control messages, in particular a client ID, a session ID, a source IP address and/or a message type. Typically, for each SIP message which is to be provided to the anomaly detection, the client ID (client address) and session ID (if it already exists) is used to address the database. Further information, such as the message type (INVITE, OPTION, BYE, etc.) a source IP address etc. may be provided to address the database and/or to be stored as context information in the database. For this purpose, the database may be adapted to insert and extract client and session records dynamically. A client record builds the root of a tree the leaves of which are sessions which the client holds. After addressing the database with the information contained in the SIP message, the database provides supplementary (context) information related to the session/client record to which the message belongs. The selection of appropriate supplementary information determines which (additional) anomalies can be detected by the anomaly detection at different layers.

In a preferred variant, the message context information is chosen from the group consisting of: session history or session state information, in particular about a message sequence and/or an allowed next message type, message interarrival times, and client history information. Session history information may include the message sequence, such that information about the current session state can be made available to the anomaly detection. As for each session state, only a limited number of allowed next message types exist, either the information about the session state/message sequence, or the information about the allowed next message types may be provided as context information to the anomaly detection. The provision of message interarrival times of the messages of the session/client to which the SIP message to be inspected is attributed may allow to detect attacks which are hidden in protocol anomalies within sessions or across (client) sessions, e.g. when session setups/updates of a specific client have been cancelled or have not been finished several times, even if the setups/updates belong to different sessions. Furthermore, the anomaly detection may implicitly perform message rate attack detection when it is fed with session control messages which are extended with message interarrival time information. Client history information, i.e. the statistics about the client's behaviour in the past can be used to adapt the amount of supplementary information which is appended to the SIP message.

The method described above may be implemented in a computer program product comprising code means adapted to perform all the steps described above. The computer program product may be implemented in a suitable software or hardware, in particular a field programmable gate array (FPGA) or an application-specific integrated circuit (ASIC).

The invention is also implemented in a security border node of the type described above, further comprising a message context provisioning unit for providing at least one session control message to the anomaly detection unit together with message context information related to a client and/or to a session to which the session control message is attributed.

A separate interface may be deployed in the message context provisioning unit for providing the context information to the anomaly detection unit together with the session control messages.

Preferably, the message context provisioning unit is adapted to include the message context information into the session control message. In such a way, no additional interface from the message context provisioning unit to the anomaly detection unit is required. The message context is typically appended to each incoming session control message before the anomaly detection and removed from the session control message after the anomaly detection has been finished. In such a way, the anomaly detection gets additional—previously invisible—information and can identify attacks which are either hidden within the additional information or the combination of this information and the session control message content.

In a preferred embodiment, the security border node further comprises a database for storing and retrieving the message context information, the message context provisioning unit addressing the database using information contained in the session control messages, in particular a client ID, a session ID, a source IP address and/or a message type. The appropriate context information may consist of mandatory and adaptive records. Mandatory records may for example comprise client and server addresses (form previous messages to/from the same client), request or message type history (INVITE, OPTIONS, 200 OK, ACK, BYE, etc.) and timestamps belonging to the same session or request. The message context provisioning unit addresses the database with the information contained in the session control message and retrieves context information related to the session and/or client to which the session control message belongs. If a message arrives which cannot be assigned to a database entry, it is either dropped by the context information provisioning unit itself or a (drop) indication entry is added into the message. Moreover, the message rate or session setup rate can be observed and the according value may be inserted into the message so that the anomaly detection can perform its decision also in dependence of this value.

Preferably, the database is adapted to store message context information chosen from the group consisting of: session history or session state information, in particular about a message sequence and/or an allowed next message type, message interarrival times, and client history information. As described above, all these types of context information are useful to detect attacks which may only be detected by taking the session and/or client history into account. However, it is understood that the context information is not limited to the examples given above, as providing other types of information may also be useful for this purpose, as will be described further below.

In a highly preferred embodiment, the message context provisioning unit is adapted to provide timestamps of the session control messages to the database. The timestamps can be used to determine the message interarrival times, thus allowing to calculate a message rate of a particular client and to identify attacks based on an increased number of messages per time unit (e.g. INVITE flooding).

In another preferred embodiment, the security border node comprises a decision unit for deciding if a session control message has to be dropped or forwarded based upon the result of the anomaly detection, the decision unit preferably providing context information about the result of the decision to the database and/or removing the message context information from the session control message. The decision unit is adapted to execute the decision of the anomaly detection unit, i.e. either drops the session control message received from the anomaly detection unit or forwards it to a session control message stack, typically a SIP stack. In the latter case, when the context information has been added to the text of the session control message, the decision unit first removes the context information from the session control message. Moreover, the context information about the result of the decision may also be a multiple state information, i.e. not necessarily a binary information, thus expressing different levels of trust for a session and/or a client and either direction. In such a way, in case that the decisions of the anomaly detection performed on several previous messages have been close to anomaly, the accumulation of these decisions may finally lead to a "drop" decision.

In another preferred embodiment, the security border node further comprises a session control message stack, in particular a SIP stack, for processing the session control messages, preferably being adapted to provide information about the result of the processing as message context information to the database. In such a way, feedback from the processing of the messages, in particular related to anomalies during the processing or allowed next message types, may be provided to the database.

In a highly preferred development, the security border node further comprises a message handling unit for handling session control messages in a different way depending on message context information about the result of the decision and/or information about the result of the processing of previous session control messages attributed to the same client and/or session. The message handling unit may drop messages belonging to a session or to a client which has been identified as an attacking session or an attacking client. Moreover, the message handling unit may forward messages directly to the decision unit or to a SIP stack without performing an anomaly detection (i.e. bypassing the anomaly detection), in case that no attack from this message is expected, as the client history indicates that the client has behaved well, i.e. has not produced any attacks, such that the anomaly detection effort needs not to be spent. It will be understood, however, that negative feedback from the SIP stack may cause the message handling unit not to bypass the anomaly detection of messages from a particular client any longer. Alternatively or in addition, the message handling unit may delay performing the anomaly detection on certain messages, in particular by attributing lower priorities to suspicious messages and/or to attribute them to a (low) priority queue. The message handling unit may also cause the message context provisioning unit to add a header to suspicious messages which indicates that these messages have to be fed to an additional security instance.

A further aspect of the invention is implemented in a packet-based network, comprising at least one security border node as described above. By equipping a packet-based network with such security border nodes, an efficient protection of the packet-based network from previously unidentified attacks is possible.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
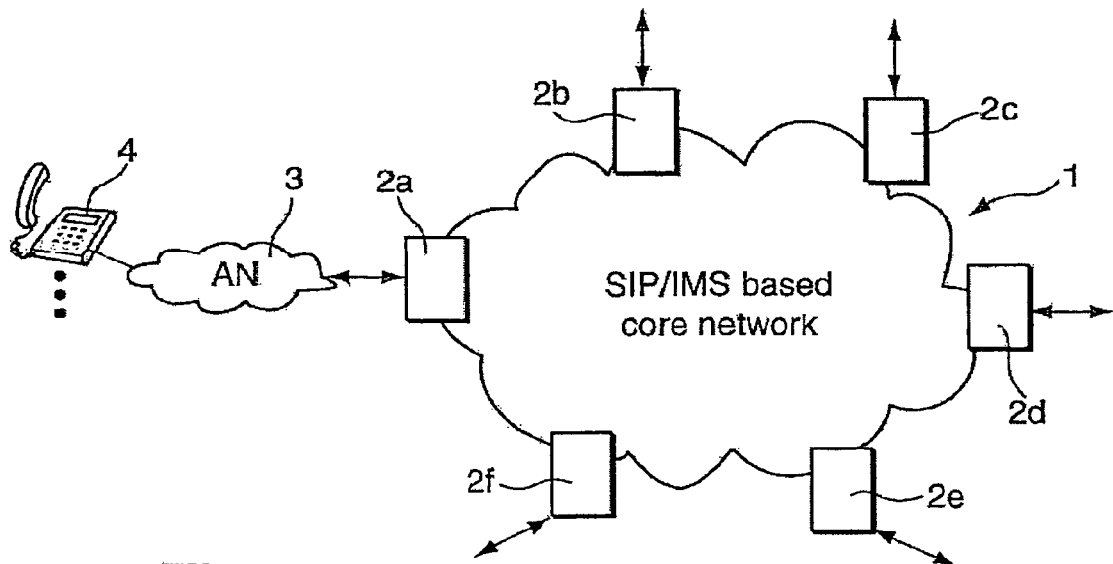
FIG. 1 shows a schematic diagram of an embodiment of a packet-based network according to the invention with several security border nodes.
Figure 2:
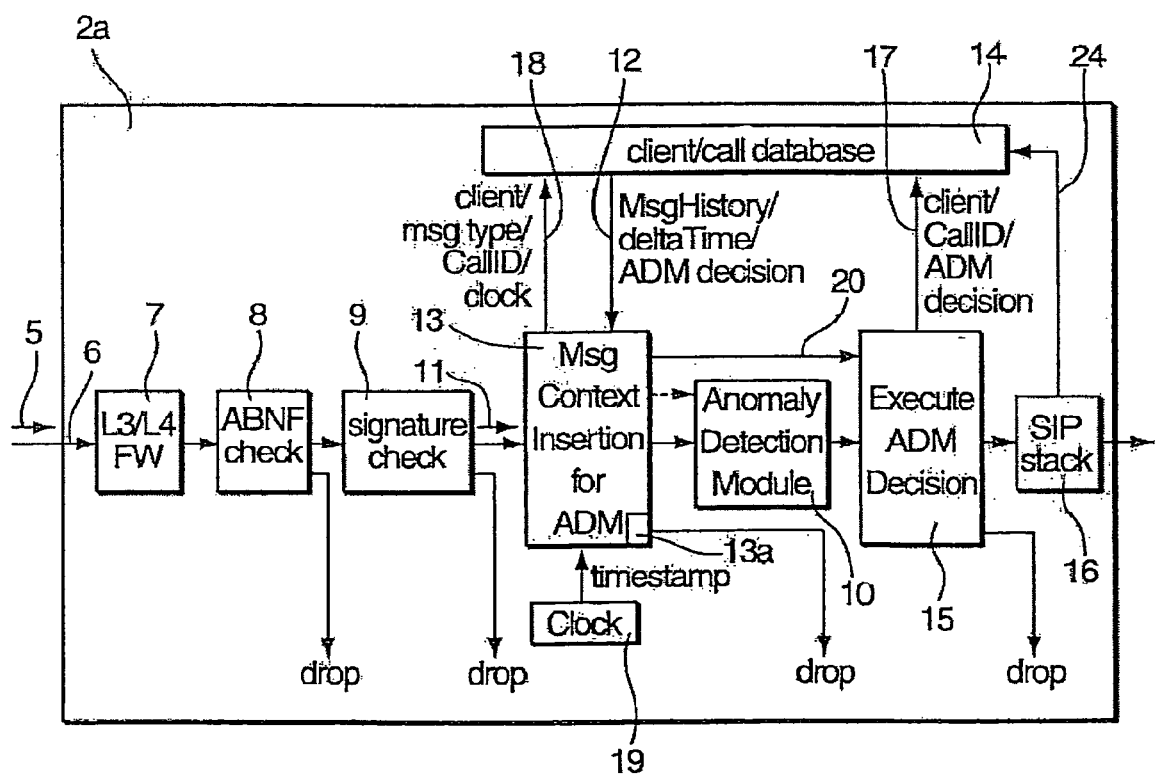
FIG. 2 shows an embodiment of a security border node according to the invention for performing anomaly detection on session control messages, taking message context information into account.

FIG. 2 shows the security border node 2a of the core network 1 of FIG. 1, not all components of which are shown for the sake of simplicity. A packet stream 5 from the access network 3 is provided to a processing path 6 of the security border node 2a. The packet stream 5 is first fed to a firewall 7 which handles layer 3 (network layer)/layer 4 (transport layer) attacks in a way which is known in the art and therefore need not be described in greater detail herein. An ABNF (Augmented Backus-Naur Form) checker 8 following the firewall 7 is used to perform a syntax check on session control (SIP) messages contained in the packet stream 5. The firewall 7 and the ABNF checker 8 are adapted to drop packets/messages in case that they are identified as attacks. A signature checker 9 following the ABNF checker 8 in the processing path 5 compares signatures of the packets of the packet stream 5 with a set of signatures of previously identified attacks, dropping packets/messages in case that the signature of a previously identified attack is found in the packet stream 5. Following the signature checker 9 is an anomaly detection unit 10, also referred to as anomaly detection module (ADM), for performing a statistical analysis (n-gram analysis) on session control messages 11 contained in the packet stream 5 which are deployed in the form of SIP messages in the present example. The anomaly detection unit 10 does not know anything about sessions or SIP messages/requests and consequently does not store any information about the current state of a session, such that it cannot identify attacks which consist of a sequence of SIP messages.

In order to detect such attacks, the SIP messages 11 are fed to the anomaly detection unit 10 together with message context information 12 about the session control message to be currently inspected, the message context information 12 being related to a client and/or to a session to which this session control message 11 belongs. For the purpose of using the message context information 12, three additional units are arranged around the anomaly detection unit 10: A message context provisioning unit 13 for providing the session control messages 11 together with the message context information 12 to the anomaly detection unit 10, a database 14 for storing and retrieving the message context information, and a decision unit 15 for deciding if a session control message has to be dropped or forwarded to a SIP stack 16 based upon the result of the anomaly detection, the decision unit 15 also providing context information 17 about the result of the decision to the database 14. In the following, the three units 13, 14, 15 will be described in greater detail.

The message context provisioning unit 13 of the security border node 2a is adapted to include message context information 12 retrieved from the database 14 into SIP messages 11 to be subsequently inspected by the anomaly detection unit 10. For this purpose, the message context provisioning unit 13 extracts information 18 from the SIP message 11, in particular the client ID of the user agent and the call ID of the current session and provided the information 18 to the database 14 for retrieving the context information 12 stored in records of the database 14 which are related to the specific client ID and call ID, the database 14 being adapted to insert and extract such records dynamically, as will be described in greater detail below. The message context provisioning unit 13 also extracts the message type from the SIP message 11, the information about the message type also being provided to the database 14, the latter being used as context information for subsequent SIP messages 11 attributed to the same session and client. Furthermore, the message context provisioning unit 13 comprises a clock generator 19 which is adapted to provide a timestamp of to the SIP message 11 currently processed, the timestamp being also provided to the database 14 and may be used as further context information for subsequent SIP messages 11 attributed to the same client or session.

The context information 12 related to the currently processed SIP message 11 received from the database 14 may be chosen e.g. as session history information, in particular about a message sequence and/or an allowed next message type, message interarrival times, and client history information, in particular about a call rate indicating the number of calls per time unit which are requested by the same client.

The message context provisioning unit 13 is adapted to include the message context information directly into the text of the SIP message 11, as will be described in the following with respect to the text of a SIP message of the BYE type being received in the context information provisioning unit 13 shown in the following:

```
BYE sip:1234@10.1.2.3:5060;user=phone SIP/2.0
Reason:Q.850;cause=95;text="invalid message"
Date:Thu, 22 Mar 2007 14:06:32 GMT
To:<sip:1234@10.1.2.3:5060;user=phone>;tag=46028a7a91
From:4711<sip:4711@10.1.2.25:5061;user=phone>;tag=58FD..
Call-ID:01F81F1C0A81400000000048@unique.de
CSeq:2 BYE
Max-Forwards:70
Timestamp:3769
Via:SIP/2.0/UDP 10.1.2.25:5061;branch=z9hG4bK..
Content-Length:0
```

The message context provisioning unit 13 then adds message context information related to the call rate of the client to which the SIP message 11 is attributed, as well as information about the previously exchanged messages of the session, in the present example an INVITE, 200 OK, and an ACK message, together with their message interarrival times to the message text, being indicated in brackets in the following message text:

```
BYE sip:1234@10.1.2.3:5060;user=phone SIP/2.0
[call rate x]
[INVITE, v ms]
[200 OK, y ms]
[Ack, 25000 ms]
Reason:Q.850;cause=95;text="invalid message"
Date:Thu, 22 Mar 2007 14:06:32 GMT
To:<sip:1234@10.1.2.3:5060;user=phone>;tag=46028a7a91
From:4711<sip:4711@10.1.2.25:5061;user=phone>;tag=58FD..
Call-ID:01F81F1C0A81400000000048@unique.de
CSeq:2 BYE
Max-Forwards:70
Timestamp:3769
Via:SIP/2.0/UDP 10.1.2.25:5061;branch=z9hG4bK..
Content-Length:0
```

It will be understood that it is not necessary for the message context provisioning unit 13 to include the message context information 12 directly into the SIP message 11, as it may also be possible to provide this information concurrently with the SIP message 11 to be inspected to the anomaly detection unit 10 using a separate interface, as indicated by a dashed arrow in FIG. 2. For taking the message context information 12 included into the SIP messages 11 into account, in either case, a training may be performed beforehand by providing a considerable number of sample SIP messages together which context information to the anomaly detection unit 10, such that the latter may learn how to perform anomaly detection on the combined message content and context information.

After the anomaly detection has been performed, the decision unit 15 either drops the inspected SIP messages or forwards them to a SIP stack 16 in dependence of the result of the anomaly detection, detecting an attack or not. It will be understood that in case that the message context information is included directly into the SIP messages 11, the decision unit 15 removes the message context information from the messages before transferring them to the SIP stack 16.

Furthermore, the decision unit 15 provides context information 17 about the result of the decision to the database 14. This context information 17 may be multiple-state information which may be used to provide the message context provisioning unit 13, more particularly a message handling unit 13a arranged therein, with information deciding whether or not subsequent messages of a client/session should be fed to the anomaly detection unit 10. In particular, the context information 17 may indicate that the next, resp. all messages of a client/session should be dropped in case that the session/client has been identified as an attacking session/client. In case that the client has well-behaved in the past, the context information 17 may indicate that SIP messages 11 attributed to a certain client/session should be forwarded directly to the decision unit 15 or the SIP stack 16, respectively, using a bypass 20. Alternatively or in addition, the context information 17 may indicate that SIP messages 11 of a certain client/session should only be provided to the anomaly detection unit 10 when an additional condition is satisfied. In such a way, different levels of trust may be attributed to a session or a client, respectively.

It will be understood that instead of dropping the messages by the message handling unit 20, it is also possible to include context information into the SIP messages 11 to be dropped which lead to an attack detection within the anomaly detection unit 11, such that the SIP messages 11 are finally dropped in the decision unit 15. In addition, the message handling unit 20 may add an indication, e.g. a header, to suspicious messages indicating that these messages should be fed to a further security instance (not shown). The message handling unit 20 may also delay performing the anomaly detection on certain messages, e.g. by attributing lower priorities to suspicious messages and by attributing them to a (low) priority queue.

Figure 3:
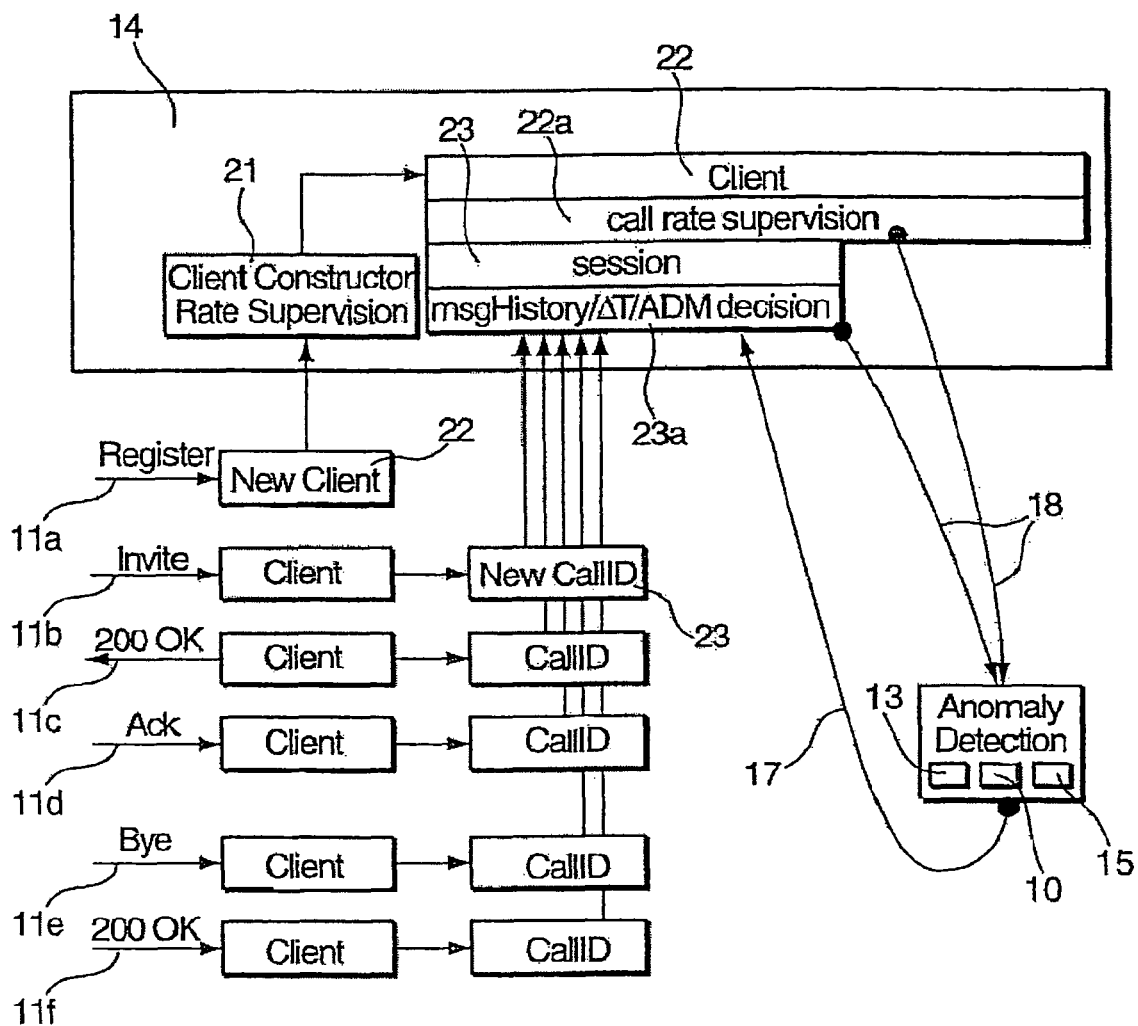
FIG. 3 illustrates the operation of a database arranged in the security border node of FIG. 2.

In the following, the client/call database 14 storing the supplementary (context) information per client and session will be described in greater detail with respect to FIG. 3. The database 14 allows inserting and extracting records dynamically, a record either representing a client or a session. A client record builds the root of a tree the leaves/branches of the tree corresponding to the sessions which the client holds. If no record of a client is available in the database 14 the client has not been registered so far. In this case, a record constructor 21 creates a new client record 22 (in the following referred to as client) if the message context provisioning unit 13 provides information about a SIP message 11a of the REGISTER type to the database 14. The message rate or session setup rate of the client 22 may be observed in the client constructor 21 and the according value may be added to the client record 22 as context information 22a in order to provide it to the message context provisioning unit 13 in the way described above, such that the anomaly detection unit 10 may perform its decision taking this value into account.

Once the client record 22 has been generated, a new session record 23, also referred to as session in the following, will be generated upon receipt of a SIP message 11b of the INVITE type. For the INVITE message 11b and the subsequent SIP messages 11c to 11f of the session 23, the context information 23a related to the session 23 is continuously updated, thus making the message history, i.e. the message sequence 11b to 11f of the session 23 and the message interarrival times $\Delta T$ available to the message context provisioning unit 13. Moreover, additional context information from the decision unit 15 may also be added to the context information 23a of the session 23 or to the context information 22a of the client 22. Moreover, the SIP stack 16 may also provide information about anomalies in the processing of the SIP messages 11 as message context information 24 to the database 14, see FIG. 2.

If a SIP message 11 arrives in the message context provisioning unit 13 which cannot be assigned to a database entry, e.g. a SIP message which cannot be attributed to a client record and is not of the REGISTER type, it is either dropped by the message context provisioning unit 13 itself or a (drop) indication entry is added into the SIP message 11. The same applies to SIP messages which may be attributed to both the client record 22 and the session record 23, however, the message type is not in conformity with the allowed sequence of SIP messages 11b to 11f of the session 23, e.g. when an INVITE message is received after an ACK message, or when more than one SIP message of the same message type is received repeatedly in the message context provisioning unit 13. In such a way, the message context provisioning unit may only provide those SIP messages 11 to the anomaly detection unit 10 which are of an allowed message type, i.e. a message type which is expected for a particular session state within the sequence 11b to 11f.

The person skilled in the art will appreciate that the context information provided for the anomaly detection is not restricted to the types described above, and that the selection of appropriate context information determines which (additional) anomalies the anomaly detection unit 10 may detect at different layers. In particular, a statistic about the client's behaviour in the past can be used to adapt the amount of supplementary information which is included into the SIP messages 11 of that client. Moreover, the context information provided from the message context provisioning unit 13, the decision unit 15 and/or the SIP stack 16 to the database 14 may be further processed within the database 14 to form modified context information, e.g. by determining the allowed message types for a subsequent message of a session from the message history, only providing this information to the message context provisioning unit 13. Alternatively, the message context provisioning unit 13 may be adapted to process the context information provided by the database 14 and to provide the modified context information to the anomaly detection unit 10.

Although the above description has been given with respect to SIP messages as an example of session control messages, the person skilled in the art will appreciate that the above approach may also be applied to messages of other protocol types, e.g. of the H.323 protocol type. In summary, in the way described above, the "zero day" attack detection capabilities of anomaly detection algorithms for these messages are extended towards signalling state awareness which allows to more efficiently guard a network against attacks which are hidden within concatenated messages or inter-linked sessions.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. Method for protecting a packet-based network from attacks, comprising:
   performing an anomaly detection in the form of a statistical analysis on a session control message contained in a packet stream received in a security border node of the network utilizing message context information about the session control message, when the session control message has a message type that matches an allowed next message type and there is no indication to bypass performing the anomaly detection on the session control message; and
   updating the message context information to include information about a result of the anomaly detection, wherein the message context information includes client history information and session history information, the client history information indicating a number of received messages and the session history information indicating the allowed next message type.

2. Method according to claim 1, further comprising the step of including the message context information in the session control message.

3. Method according to claim 1, further comprising:
   addressing a database for storing and retrieving the message context information.

4. Method according to claim 1, wherein the session history information is used to determine a client call rate, the allowed next message type, and message interarrival times.

5. Security border node for protecting a packet-based network from attacks, comprising:
   an anomaly detection unit configured to perform an anomaly detection in the form of a statistical analysis on a session control message contained in a packet stream received in the security border node utilizing message context information related to a session to which the session control message is attributed, when the session control message has a message type that matches an allowed next message type and there is no indication to bypass performing the anomaly detection on the session control message; and
   a message context provisioning unit configured to provide the session control message and the message context information to the anomaly detection unit, and update the message context information to include information about a result of the anomaly detection, wherein the message context information includes client history information and session history information, the client history information indicating a number of received messages and the session history information indicating the allowed next message type.

6. Security border node according to claim 5, wherein the message context provisioning unit is configured to include the message context information into the session control message.

7. Security border node according to claim 5, further comprising:
a database configured to store and retrieve the message context information, wherein
the message context provisioning unit is configured to address the database.

8. Security border node according to claim 7, wherein the anomaly detection unit performs anomaly detection using the database to determine a client call rate, the allowed next message type, and message interarrival times.

9. Security border node according to claim 7, wherein the message context provisioning unit is configured to provide timestamps of the session control messages to the database.

10. Security border node according to claim 5, further comprising:
a decision unit configured to decide if the session control message has to be dropped or forwarded based upon the result of the anomaly detection.

11. Security border node according to claim 7, further comprising:
a session control message stack, configured to process the session control messages and provide information about the result of the processing as a message context information to the database.

12. Security border node according to claim 10, further comprising:
a message handling unit configured to handle session control messages in a different way depending on the message context information about the result of the decision and/or the information about the result of the processing of previous session control messages attributed to the same client and/or session.

13. Packet-based network, comprising at least one security border node according to claim 5.

14. A non-transitory computer program product comprising code means configured to perform all the steps of the method according to claim 1.

15. Security border note according to claim 5, wherein the client identity history includes information associated with a client ID, a session ID and a source IP address.

16. Security border note according to claim 10, wherein when the decision unit decides to drop the message, information about the result of the decision is sent to the database.

17. Security border note according to claim 10, wherein when the decision unit decides to forward the message, the message context information is removed from the session control message.

* * * * *